United States Patent [19]

King, Jr. et al.

[11] Patent Number: 5,459,226
[45] Date of Patent: Oct. 17, 1995

[54] POLYCARBONATE REDISTRIBUTION METHOD

[75] Inventors: Joseph A. King, Jr., Niskayuna; Patrick J. McCloskey, Watervliet; David M. Dardaris, Ballston Spa, all of N.Y.

[73] Assignee: General Electric Company, Schenectady, N.Y.

[21] Appl. No.: 280,956

[22] Filed: Jul. 27, 1994

[51] Int. Cl.$^6$ .............................. C08G 63/32; C08G 64/42
[52] U.S. Cl. ........................ 528/196; 524/611; 525/461; 525/462; 528/198; 528/204; 528/370; 528/371
[58] Field of Search ...................................... 528/196, 198, 528/204, 370, 371; 525/461, 462; 524/611

[56] References Cited

U.S. PATENT DOCUMENTS

| | | |
|---|---|---|
| 4,605,731 | 8/1986 | Evans et al. . |
| 4,650,852 | 3/1987 | Evans et al. . |
| 4,888,400 | 12/1989 | Boden et al. . |
| 5,021,521 | 6/1991 | Krabbenhoft et al. . |
| 5,097,008 | 3/1992 | Krabbenhoft et al. ................. 528/204 |
| 5,256,728 | 10/1993 | Dardaris et al. ....................... 524/611 |

FOREIGN PATENT DOCUMENTS 0595608A  6/1994  European Pat. Off. .

OTHER PUBLICATIONS

Article–The Chemistry & Physics of Polycarbonates, Herman Schnell et al., Interscience Publishers, Germany Dec. 1964 pp. 180–183.

Primary Examiner—James J. Seidleck
Assistant Examiner—John M. Cooney, Jr.
Attorney, Agent, or Firm—William H. Pittman

[57] ABSTRACT

The present invention is directed to a method for effecting the redistribution of polycarbonate and polycarbonate blends utilizing a tetraorganophosphonium carboxylate salt.

6 Claims, No Drawings

POLYCARBONATE REDISTRIBUTION METHOD

CROSS REFERENCE TO A RELATED APPLICATION

Reference is made to application Ser. No. 08/206,692 filed Mar. 7, 1994, which is now U.S. Pat. No. 5,412,061.

BACKGROUND OF THE INVENTION

The present invention relates to a method for reducing the molecular weight of a source polycarbonate having a molecular weight in the range of about 22,000 to about 68,000 using an effective amount of a tetraorganophosphonium carboxylate salt as a redistribution catalyst. The term "redistribution" is defined herein as a process for reforming a source polycarbonate having an initial weight average molecular weight to a polycarbonate having a lower weight average molecular weight.

Manufacturers of polycarbonate often produce several grades of polycarbonate falling within a molecular weight in the range of about 16,000 to about 68,000. In many instances, due to the exhaustion of one or more particular polycarbonate grades to satisfy particular marketing demands, build-up in the inventory of rejected or recycled polycarbonate, there can result excesses or shortages of polycarbonate in a particular molecular weight range.

Procedures for converting existing inventories to anticipate future needs or satisfy immediate demands in a particular polycarbonate grade, including the use of recycled or rejected material are often implemented. Polycarbonate modification can be achieved by blending one grade of polycarbonate with a different grade of polycabonate. Another procedure which can be used involves direct modification of molecular weight employing a redistribution catalyst.

There is shown in EP 0595608 (Nov. 27, 1993), a redistribution procedure for modifying organic polycarbonates, such as polymers prepared by the heterogeneous interfacial polymerization of an organic bis hydroxy compound, such as 2,2-bis(4-hydroxyphenyl)propane (bisphenol A). A wide variety of redistribution catalysts are illustrated, including a tetraalkylammonium base, such as a tetraalkylammonium hydroxide which is preferred. Another polycarbonate redistribution procedure is shown by Krabbenhoft et al., U.S. Pat. No. 5,021,521 employing a catalyst such as tetrabutylammonium tetraphenylborate.

Although various redistribution procedures are available for modifying the molecular weight of polycarbonate to satisfy marketing demands, polycarbonate manufacturers have found that the use of redistribution catalysts often can result in stability problems, or environmental concerns. It has been found for example that a tetraalkylammonium base, such as a tetraalkylammonium hydroxide can form amine residues which can lead to polycarbonate degradation. Upon the degradation of tetraphenylborate catalysts, such as tetrabutylammonium tetraphenylborate, benzene can be generated as a by-product.

It would be desireable, therefore, to be able to produce a wide variety of polycarbonates from a source polycarbonate by a redistribution procedure which did not result in the generation of deleterious or environmentally unattractive residues.

SUMMARY OF THE INVENTION

The present invention is based on the discovery that an effective amount of a tetraorganophosphonium carboxylate salt can be used as a redistribution catalyst for altering the molecular weight of a source polycarbonate without the generation of deleterious or environmentally unattractive by-products. As used hereinafter, term "source polycarbonate" means a polycarbonate selected from the group consisting of (a) a polycarbonate homopolymer having a molecular weight in the range of about 22,000 to about 100,000 and, (b) a melt extruded polycarbonate blend consisting essentially of by weight, (i) 100 parts of polycarbonate having a molecular weight in the range of about 22,000 about 100,000 and, (ii) 1 to about 100 parts of bisphenol, or a polycarbonate which is essentially different from (i) and has an IV in the range of about 0.01 to about 1.0 dl/g in chloroform at 25° C.

Surprisingly, although the tetraorganophosphonium carboxylate salts can be used effectively as redistribution catalysts in the practice of the present invention, the corresponding tetraorganophosphonium halides, such as tetraorganophosphonium chloride, have been found to be ineffective as redistribution catalysts.

STATEMENT OF THE INVENTION

There is provided by the present invention, a polycarbonate redistribution method for altering the molecular weight of a source polycarbonate having an initial molecular weight in the range of from about 22,000 to about 100,000, which polycarbonate redistribution method comprises, effecting reaction at a temperature in the range of from about 200° C. to about 340° C., between the source polycarbonate and an amount of tetraorganophosphonium carboxylate salt which is sufficient to effect a reduction in the molecular weight of the polycarbonate, and provide a melt flow index (g/10 min) in the range of from about 5.0 to about 80.

As used hereinafter, the expression, "MFI" (melt flow index), or "MFR" (melt flow rate) means melt flow of polycarbonate resin which is determined by measuring the weight of resin extruded at a controlled load of 1200 g through a standard orifice 300° C. The procedure applies to nonreinforced polycarbonate having a flow rate of from 2.5 to 50 grams/10 minutes. There can be used, a Tinius Olsen Melt Indexer, Model T-3 with a 300° C. thermometer.

Among the polycarbonates which can be redistributed in accordance with the practice of the invention, are those formed by phosgenating bisphenyl, in the presence or absence of a chain terminator, such as phenol or a diaryl carbonate for example diphenyl carbonate. Polycarbonate which is made by ester interchange under melt polymerization conditions is included in the practice of the invention. Bisphenol A (BPA) polycarbonate having an intrinsic viscosity (IV) of from 0.35 to 1.8 dl/g in chloroform at 25° C. is preferred. In addition, polycarbonate having a molecular weight of from about 25,000 to about 65,000 is of particular interest.

Among the polycarbonates which can be redistributed in accordance with the invention are polymers based on the use of the following bisphenols:
resorcinol
4-bromoresorcinol
hydroquinone
4,4'-dihydroxybiphenyl
1,6-dihydroxynaphthalene
2,6-dihydroxynaphthalene
bis(4-hydroxypentyl)methane bis (4-hydroxyphenyl)diphenylmethane
bis (4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
a,a'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2 -bis(3-t-butyl-4-hydroxyphenyl)propane2,2-Bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane("spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole.

Some of the tetraorganophosphonium carboxylates which can be used in the practice of the invention are for example,
tetramethylphosphonium acetate
tetraethylphosphonium acetate
tetrapropylphosphonium acetate
tetrabutylphosphonium acetate
tetrapentylphosphonium acetate
tetrahexylphosphonium acetate
tetraheptylphosphonium acetate
tetraoctylphosphonium acetate
tetradecylphosphonium acetate
tetradodecylphosphonium acetate
tetratolylphosphonium acetate
tetraphenylphosphonium acetate
tetramethylphosphonium benzoate
tetraethylphosphonium benzoate
tetrapropylphosphonium benzoate
tetraphenylphosphonium benzoate
tetramethylphosphonium formate
tetraethylphosphonium formate
tetrapropylphosphonium formate
tetraphenylphosphonium formate
tetramethylphosphonium propionate
tetraethylphosphonium propionate
tetraphenyllphosphonium propionate
tetramethylphosphonium butyrate
tetraethylphosphonium butyrate, and
tetrapropylphosphonium butyrate.

An effective amount of the tetraorganophosphonium carboxylate salt is from about 0.0001% by weight to about 0.20% by weight, based on the weight of melt extruded mixture of polycarbonate and tetraorganophosphonium carboxylate salt.

In the practice of the invention, contact between the polycarbonate and the tetraorganophosphonium carboxylate salt or "catalyst" is preferably effected in the absence of an organic solvent. Blending of the catalyst and the polycarbonate can be achieved by separate addition into an extruder under melt conditions. A preblend of the source polycarbonate and catalyst in the form of a masterbatch also has been found to facilitate addition into an extruder or Helicone melt reactor.

In order that those skilled in the art will be better able to practice the present invention, the following examples are given by way of illustration and not by way of limitation. All parts are by weight unless otherwise indicated. The tetraorganophosphonium carboxylic salt catalysts (all monohydrates), were prepared from the corresponding tetraarylphosphonium or tetraalkylphosphonium chloride or bromide (Aldrich Chemical Co.) using silver acetate or silver benzoate.

Example 1

Several blends of tetraphenylphosphonium propionate were individually prepared in a Henschel mixer with a polycarbonate resin powder. The polycarbonate resin had an initial molecular weight of about 48,387. The respective blends were melt extruded in a W&P 28 mm twin screw extruder equipped with vacuum venting. The extrusion conditions were a barrel set temperature of 260° C., a feed rate of 12 lb/h, and a screw speed of 325 rpm. The catalyst was used over a range of 200 ppm to 600 ppm.

The effectiveness of the tetraphenylphosphonium propionate as a redistribution catalyst is shown by a molecular weight decrease as the concentration of the catalyst increases. The following results were obtained:

| Catalyst Amount | $M_w$ | $M_n$ | $M_w/M_n$ | $M_z$ |
| --- | --- | --- | --- | --- |
| — | 48,387 | 17,763 | 2.724 | 78,310 |
| 200 ppm | 46,144 | 17,020 | 2.711 | 74,982 |
| 400 ppm | 44,993 | 16,662 | 2.707 | 73,406 |
| 600 ppm | 43,257 | 16,098 | 2.687 | 70,497 |

The above results show that as the concentration of the catalyst increases, the molecular weight ($M_w$) and the resin dispersity ($M_w/M_n$) decreases.

Example 2

Blends of recycled water bottle grade polycarbonate having an MFI (melt flow index ), of about 4.4 (g/10 min) and compact disk (CD) regrind polycarbonate having an MFI of about 68 (g/10 min) were melt extruded and measured for the resultant MFI. The following results were obtained:

TABLE 2

| Water Bottle | CD Regrind | M.F.I (g/10 min) |
|---|---|---|
| 100% | — | 4.4 |
| 90 | 10 | 6.7 |
| 80 | 20 | 8.7 |
| 70 | 30 | 8.8 |
| 50 | 50 | 10.9 |
| 30 | 70 | 25.0 |

As shown by the above results, a signifcant amount of recycled CD regrind is needed to obtain an MFI in the preferred range of about 8.5 to about 25. Certain blends of the recycled polycarbonates of table 2, were then melt extruded with 300 ppm of tetrabutylphosphonium acetate(nBu)$_4$POAc. The following results were obtained:

TABLE 3

| Water Bottle | CD Regrind | (nBu)$_4$POAc | M.F.I |
|---|---|---|---|
| 90 | 10 | 300 ppm | 8.8 (g/10 min) |
| 70 | 30 | " | 17.4 |
| 50 | 50 | " | 49.2 |

The above results show that the incorporation of 300 ppm of tetrabutylphosphonium acetate into the blends produced a significant increase in MFI. As a result, a polycarbonate fabricator having only a small inventory of CD recycled polycarbonate resin would be able to obtain an 8.8 MFI with only 10 parts of the CD recycled resin per 100 parts of the blend instead of using 20 pares of the CD recycled polycarbonate resin.

Although the above examples are directed only a few of the very many tetraorganophosphonium carboxylate salts and polycarbonates which can be used in the practice of the method of the invention, it should be understood that the present invention directed to the use of a much broader variety of materials as shown in the description preceding these examples.

What is claimed:

1. A polycarbonate redistribution method for altering the molecular weight of a source polycarbonate having an initial weight average molecular weight in the range of from about 22,000 to about 68,000, which polycarbonate redistribution method comprises, effecting reaction at a temperature in the range of from about 200° C. to about 340° C., between the source polycarbonate and an amount of tetraorganophosphonium carboxylate salt which is sufficient to effect a reduction in the molecular weight of the polycarbonate, and provide a melt flow index (g/10 min) in the range of from about 5.0 to about 80.

2. A polycarbonate redistribution method in accordance with claim 1, where the source polycarbonate is a bisphenol A polycarbonate.

3. A polycarbonate redistribution method in accordance with claim 1, where the tetraorganophosphonium carboxylate salt is tetrabutylphosphonium acetate.

4. A polycarbonate redistribution method in accordance with claim 1, where the source polycarbonate is a polycarbonate homopolymer.

5. A polycarbonate redistribution method in accordance with claim 1, where the source polycarbonate is a melt extruded polycarbonate blend consisting essentially of by weight,
   (i) 100 parts of polycarbonate having a weight average molecular weight in the range of about 22,000 to about 68,000 and
   (ii) 1 to about 100 parts of bisphenol, or a polycarbonate which is essentially different from (i) and has an intrinsic viscosity (IV) in the range of about 0.01 to about 1.0 dl/g in chloroform at 25° C.

6. A polycarbonate redistribution method in accordance with claim 5, where the melt extruded polycarbonate is a blend of water bottle grade polycarbonate and compact disk (CD) grade polycarbonate.

* * * * *